Inventor
EARL A. THOMPSON
By J. L. Chisholm
Attorney

Sept. 10, 1968         E. A. THOMPSON         3,400,696
                         VALVE TRAIN
Filed Jan. 5, 1966                      3 Sheets-Sheet 2

*Inventor*
EARL A. THOMPSON
By J. L. Chisholm
Attorney

United States Patent Office 3,400,696
Patented Sept. 10, 1968

3,400,696
VALVE TRAIN
Earl A. Thompson, Bloomfield Hills, Mich., assignor to Earl A. Thompson Manufacturing Co., a corporation of Michigan
Filed Jan. 5, 1966, Ser. No. 518,815
6 Claims. (Cl. 123—90)

This invention relates to mechanisms for operating the poppet valves of internal combustion engines having overhead camshafts.

In such engines, it is customary to have the camshaft operate the valves through pivoted rocker arms each bearing on a valve. An example of such general arrangement is shown in U.S. Patent 2,763,250 to Bensinger et al dated Sept. 18, 1956. It is also customary to provide an automatic lash adjuster, called a hydraulic tappet, to take up lost motion in the valve train or valve actuating mechanism. Such a tappet customarily includes an assembly which is constantly urged to expand to take up slack when the valve is closed. When the valve is being opened, the tappet is urged to collapse by the force of the cam opening the valve against the force of the valve closing spring, but the collapse is retarded so that the tappet becomes substantially rigid, and the cam can be effective to open the valve.

An example is shown in my U.S. Patent 2,935,059, May 3, 1960. Such devices often have a plunger sliding in a cup-shaped guide called the tappet body, a spring constantly urging the plunger out of the body and toward the pivot end of the rocker arm, and an oil trap between the plunger and the body to retard collapse. The plunger carries a fulcrum for supporting the pivot end of the rocker arm, variously called a push rod seat or a rocker arm seat.

In such devices the only useful force of the cam in opening the valve is that component of force which produces motion of the rocker arm in the direction of the axis of the valve stem. While the customary rotary cam does provide this motion of the rocker arm, it also provides an undesirable force. Because as the cam rotates, its surface rubs along the length of the rocker arm, it applies thrust to the rocker arm back and forth in the direction of its length which is transverse to the direction of reciprocation of the plunger. Because the load between the cam and the rocker arm is periodically heavy, this thrust is large. This causes side thrust on the seat, which in turn produces side thrust between plunger and body, which in turn causes destructive wear of the plunger or body or both. Even a small amount of such wear is serious because the fit, or clearance, between the plunger and body must be maintained within critical limits in order to control the rate of escape of oil from the oil trap, which controls the rate of collapse of the tappet, and thus controls the amount and timing of the valve opening.

One of the objects of this invention is to provide an improved valve train in which it is impossible to develop side thrust between the plunger and body of the tappet.

More specifically it is an object to mount the pivot end of the rocker arm in a guide which is rigidly secured in the engine so that all side thrust due to endwise force on the rocker arm is taken directly by the body of the engine and cannot be transmitted to the seat.

Another object of the invention is to provide one bearing surface for transmitting this side thrust to the engine and another bearing surface for transmitting axial thrust from the tappet to the rocker arm.

Another object is to pivot the rocker arm in the same guide in which the plunger slides, but at a point which cannot be traversed by the plunger, so that wear on the guide produced by the pivot cannot affect the fit of the plunger.

Another problem in valve trains of this type is that rotation of the rocker arm alone, and apart from any end thrust imparted by the cam, causes rubbing across the rocker arm seat, causing side thrust on the seat.

Therefore another object is to provide an arrangement in which any side thrust on the fulcrum, due to rocking motion of the rocker arm, as contrasted with side thrust from the cam, is absorbed by the body of the engine and cannot be transmitted to the plunger.

Another problem in valve trains of this type is adequate lubrication between the cam and the rocker arm while preventing excessive lubrication. Excessive lubrication is known to be harmful because too much oil gets into the cylinders and this causes well known undesirable effects. If a small enough lubricating passage is used to restrict the volume of lubricant supplied, this is apt to become clogged by fine solid particles or gum in the oil. If a large enough passage is used to prevent clogging, too much lubricant is supplied.

Accordingly another object of the invention is to provide an improved arrangement for positively lubricating and cooling the cam surface with the correct amount of oil and for periodically varying the size of control orifices to prevent clogging.

More particularly it is an object to construct and arrange the rocker arm seat and the bearing surface of the rocker arm so that these two cooperate to form a pair of variable orifices each of which is mechanically and cyclically varied while maintaining substantially constant the combined flow through both orifices.

These and other objects and advantages of the invention will be apparent from the following description and from the accompanying drawings, in which.

Figure 1:
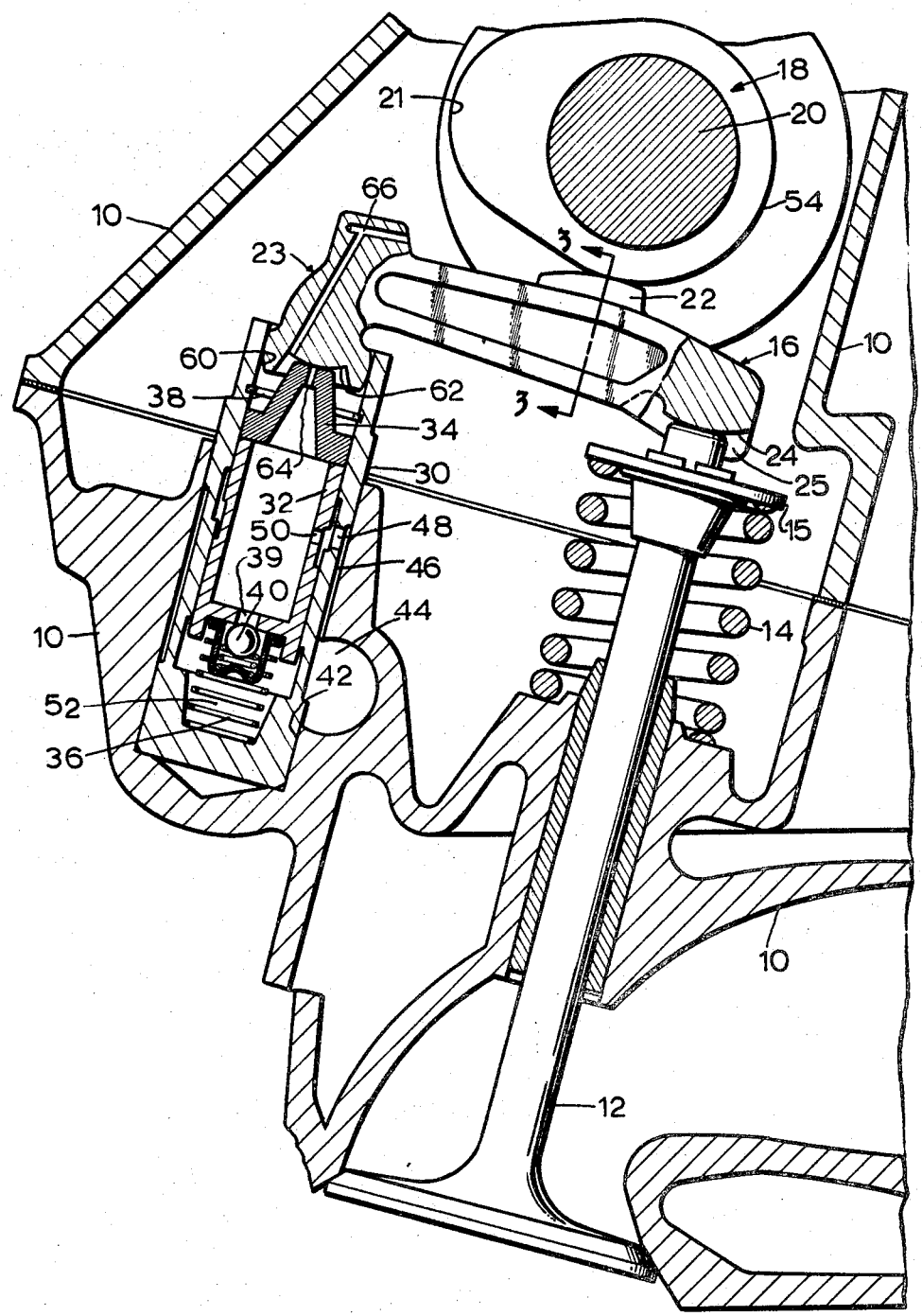
FIG. 1 is a transverse vertical section through an engine, showing partly in section and partly in elevation a valve train embodying one form of the invention.
Figure 2:
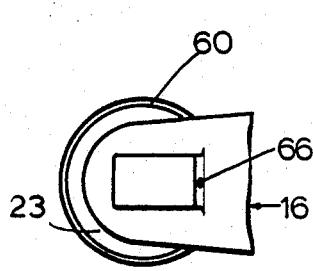
FIG. 2 is a top plan view of the left end of the rocker arm shown in FIG. 1 showing a spherical bearing surface and the outlet of a lubricating conduit.
Figure 3:
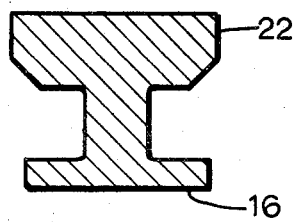
FIG. 3 is a section of the rocker arm on the line 3—3 of FIG. 1.
Figure 4:
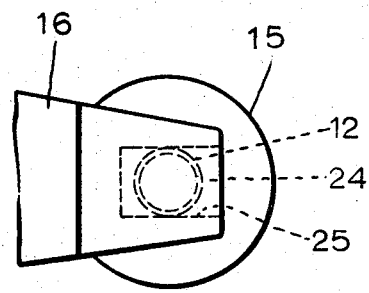
FIG. 4 is a top plan view showing the right end of the rocker arm which operates the valve, and the valve spring retainer.
Figure 5:
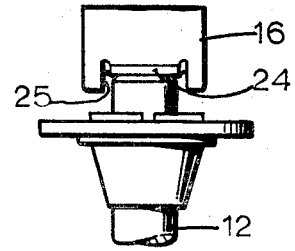
FIG. 5 is an end elevation of the rocker arm as seen from the right of FIG. 1 showing the relationship of the rocker arm to the valve stem.
Figure 6:
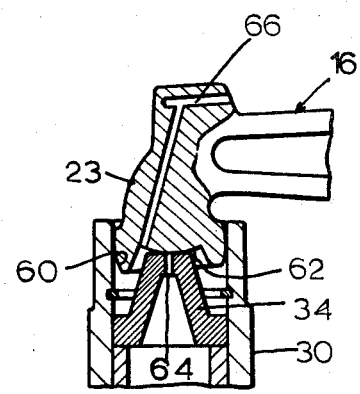
FIG. 6 is a section corresponding to FIG. 1 of a portion of the automatic lash adjuster with the rocker arm in one position.

Referring to FIG. 1, 10 is an engine head in which is mounted a valve 12 normally closed by a valve spring 14 acting on a spring retainer 15. The valve is opened against the force of this spring by a rocker arm 16 when the rocker arm is depressed by the cam 18 fixed to a camshaft 20 mounted in the engine head. The rocker arm is of I-shaped section, to combine rigidity with light weight, as shown in FIG. 3. The left hand end of the rocker arm is pivoted so that the right end swings down to open the valve when the lobe 21 of the cam engages the cam pad 22. The rocker arm 16 is constantly urged counterclockwise about its pivot end 23 by the valve spring 14 which pushes the valve stem 12 against a rocker bearing surface 24 in a pocket 25 in the right end of the rocker arm. The pivot end 23 of the rod is automatically urged upward, to hold the cam pad 22 against the face of the cam. This is accomplished by an automatic lash adjuster or hydraulic valve tappet of generally known arrangement, which known construction however, is modified as herein explained to carry out the invention.

The tappet or automatic valve lash adjuster may include a cup-shaped body or guide 30 closed at its lower end. Slidable in the tubular portion of the cup is a plunger 32 which supports at its upper end a rocker arm seat 34 having an upper surface 35 which acts as a fulcrum for the pivot end of the rocker arm. The fulcrum is piloted in the bore of the cup, for a purpose to be explained. The plunger is constantly urged upward or out of the cup by a compression spring 36 of flat rectangular wire and it is positively retained in the cup by a snap ring 38. The plunger is also cup-shaped and has in its bottom or lower wall an oil passage 39 controlled by a spring-seated ball check valve 40. The body 30 is rigidly secured in a bore 42 in the engine head 10. Oil from the engine pump is supplied to the bore by a gallery 44 which is a source of oil under pressure. From the gallery 44 oil flows into an annular chamber 46 formed between the bore 42 and a portion of reduced diameter of the tappet body 30, then into the cup through passage 48 through its wall, and to the inside of the plunger through passage 50 in the plunger wall. Oil can flow out of the plunger through passage 39 into the oil trap or lower chamber 52 formed between the bottom of the plunger 32 and the bottom of the body 30.

Oil can also flow out of the plunger through the seat 34 to lubricate the cam 18 and pad 22 as will be explained. When the cam lobe 21 has turned past the pad 22, the tappet spring 36, in moving the plunger upward to hold the rocker arm in engagement with the base circle or dwell surface 54 of the cam, reduces the pressure of the oil in the chamber 52. Consequently oil supplied at higher pressure by the engine pump to the inside of the plunger opens the check valve 40 and replaces any oil which may have leaked from the chamber 52. When the lobe 21 depresses the rocker arm it urges the plunger 32 down. This closes the check valve and traps oil in the chamber 52 which tends to hold the plunger in fixed position so that the seat 34 tends to act as a fixed pivot for the rocker arm, which then swings clockwise to open the valve as is known.

Under the force of the cam, oil leaks out of the chamber 52 between the plunger and the body and enters the inside of the plunger through the opening 50. This arrangement automatically takes oil from the inside of the plunger into the chamber 52 and subsequently expresses excess oil from the chamber 52 back into the inside of the plunger during each revolution of the cam. This automatically takes up all lost motion or lash in the valve train, as is known, and holds the pivot end of the rocker arm within a small limit of motion throughout the cycle. It automatically compensates for wear.

It is known that it is essential to prolonged and reliable operation of the tappet that the clearance between the plunger 32 and the body 30 be small and that it be maintained substantially constant over long periods of time. This clearance controls the leak-down rate or rate of escape of oil from the trap 52 into the plunger on the opening stroke of the valve. Heretofore it has been the practice to pilot or support the fulcrum or rocker arm seat in the bore of the plunger and to have this seat serve as the pivot bearing for the rocker arm. As the cam rotates clockwise the base circle of the cam urges the rocker arm along its length toward the left as FIG. 1 is seen and this force along the length of the rocker arm becomes particularly severe when the rocker arm is under load from the rising face of lobe 21. In previous constructions these forces urged the plunger strongly against the side of the body 30 and this caused excessive wear of the body or plunger or both, which wear destroyed the accurate fit between the plunger and the body required for reliable operation.

When the receding face of the lobe engages the pad the severe force along the rocker arm changes toward the right, as FIG. 1 is seen.

I prevent any lateral thrust from the cam on the plunger by a spherical pivot surface 60 which fits snugly in the upper end of the bore in the body 30. This spherical surface allows the rocker arm to rock about the seat and transmits all of the lateral thrust from the cam directly to the engine head through the fixed cup or body 30. The bearing zone between the spherical surface 60 and the body 30 is outside the snap ring 38 in a non-critical part of the bore of the body. No amount of wear here can affect the clearance between the plunger and body.

A rocking bearing surface 62, preferably cylindrical, supports the rocker arm on the seat. As the cam alternately depresses and releases the rocker arm, the surface 62 rolls across the surface 35 while the spherical surface 60 slides in the upper end of the bore of the body 30 as the rocker arm pivots.

In order to lubricate and cool the surfaces 60 and 62 and the bearing between the cam and the rocker arm pad 22 I prefer to supply lubricant, which is also a coolant, to these surfaces at a substantially constant, metered or measured rate. This may be done through a lubricating passage 64 in the seat and a continuing conduit 66 formed in the pivot end of the rocker arm and discharging adjacent the cam. Oil under pressure is squirted onto the cam and rocker arm pad 22, being supplied from the source of pressure 44 through annular chamber 46, openings 48, 50 and 64 and passage 66.

Since a passage which is small enough to deliver lubricant at the required rate is so small that it is apt to clog, I provide a large passage and control or meter the lubricant through one or more calibrated orifices. Each of the orifices is small enough to clog. Therefore I periodically enlarge the orifices to discharge any clogging material which may have lodged in them.

The passage 64 is a round hole, in the surface 35, and discharges between the cylindrical surface 62 and the surface 35. The surface 62 is cylindrical, and preferably but not necessarily circular. This prevents it from ever completely closing the passage 64. This is because the surface of the fulcrum is preferably a plane, although it may be substantially spherical, and if spherical convex, to the surface 62. In any event it does not conform to surface 62, and it must be symmetrical with respect to the center of passage 64 to eliminate any effect of different rotational position of the fulcrum in the assembly operation. Consequently only one line can be drawn on the surface 62 which touches opposite points of the circle formed by the intersection of the passage 64 with the upper surface of the fulcrum. All other points on the surface 62 are farther away from the surface of the fulcrum.

Figure 7:
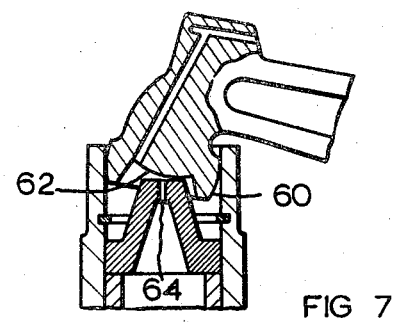
FIG. 7 is a section corresponding to FIG. 6 but showing the rocker arm in a different position, the amount of movement being exaggerated for clarity of illustration.
Figure 8:
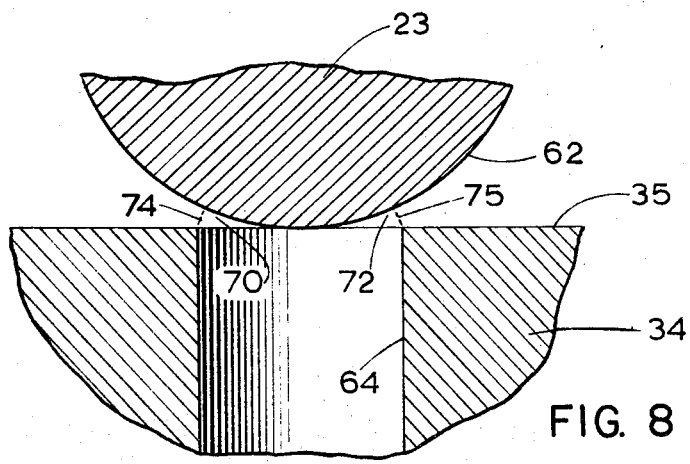
FIG. 8 is a greatly enlarged section corresponding to FIG. 6 of a portion of the rocker arm and lash adjuster, the proportions of the parts being varied from those shown in FIG. 6 to illustrate the principle of orifice control.
Figure 9:
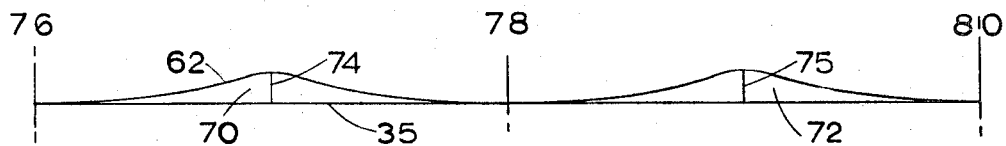
FIG. 9 is a more enlarged developed or unrolled elevation of the lubricating orifices of FIG. 8.
Figure 10:
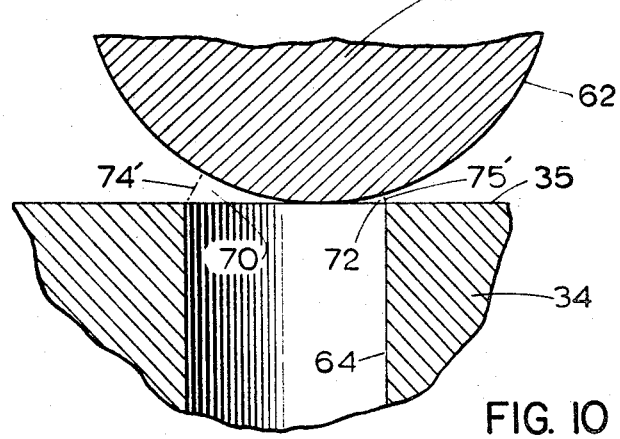
FIG. 10 is an enlarged view corresponding to FIG. 8 showing the parts corresponding to the position of FIG. 7.
Figure 11:
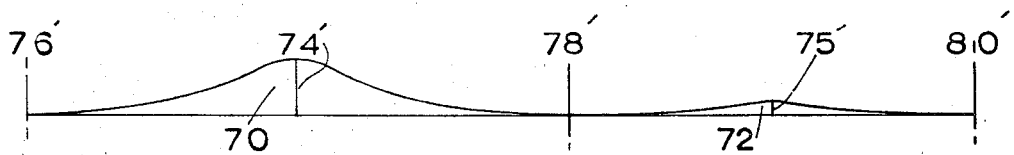
FIG. 11 is a view corresponding to FIG. 9 of the orifices in FIG. 10.

The relationship between surfaces 35 and 62 can be understood from the exaggerated showings in FIGS. 8–11. When the surface 62 is centered over the passage 64, two equal orifices 70 and 72 are formed. As shown in FIG. 9 these have equal maximum heights 74 and 75, and equal widths 76–78 and 78–80. As the rocker arm is depressed, the surface 62 rolls across surface 35 toward the position of FIG. 7 and may take the position illustrated in FIG. 10. In this the height 74 has increased to 74′ while the height 75 has decreased to 75′. Also the width 76–78 has increased to 76′–78′ and the length 78–80 has decreased to 78′–80′.

As the rocker arm returns to its original position the orifices return to their relationship shown in FIG. 8. Further rising of the rocker arm rolls the surface 62 to the left to reduce the orifice 70 and increase the orifice 72 in a manner which is the reverse of that explained above.

This alternately enlarges each orifice to a size which prevents clogging. As each orifice is expanded the other orifice is reduced so that the total area of the sum of the orifices may remain substantially constant.

Alternatively the surface 62 can roll so that only one orifice is provided as illustrated in FIG. 7. This single orifice can be enlarged and reduced by rolling of the surface 62. While this may theoretically vary the instantaneous rate of flow of lubricant, the integrated rate of flow, averaged over very short periods of time, is substantially constant for all practical purposes and the alternate reduction of total outlet area of passage 64 can produce a pulsating pressure and pulsating flow through the orifice which tends to prevent clogging.

Independently of any side thrust caused by the cam, the oscillating rotary motion of the rocker arm rubs the surface 62 across the fulcrum in a direction transverse to the wall of the body 30. This occurs in spite of the spherical pivot surface 60. This rubbing motion may also help keep the end of the passage 64 from clogging. Consequently side thrust on the fulcrum can be produced, even by my improved rocker arm. Such side thrust is relatively small, compared to the side thrust due to the cam and may be reduced to a minimum by appropriate design and location of the surface 62 including choice of radius of surface 62 and location of the center of the spherical surface 60 on the surface 62. However, to prevent transfer of this side thrust from the fulcrum to the plunger, the fulcrum is piloted in the body 30 beyond the region in which critical fit between the plunger and body must be maintained. The only possible contact between the fulcrum and the upper end of the plunger is along a well lubricated plane perpendicular to the direction of motion of the plunger. Furthermore the fulcrum is piloted in the fixed bore of the body 30 so that no significant sidewise motion of the fulcrum can occur. Consequently no significant side thrust on the plunger can be produced by the fulcrum.

I claim:

1. An internal combustion engine comprising in combination a reciprocable valve supported in the engine; a rocker arm having a rocking surface bearing on the valve; pivot means on the rocker arm including a convex cylindrical surface for engaging a fulcrum and a spherical surface for engaging a guide, the centers of the spherical and cylindrical surfaces being separated from one another; a cam engaging the rocker arm for oscillating the rocker arm which cam produces forces on the rocker arm in the direction of the length of the rocker arm; an automatic lash adjustor for the pivot including a fixed guide in the engine which receives and slidingly fits the spherical surface of the pivot means, a fulcrum having a substantially flat surface bearing against the cylindrical surface, the fulcrum being in sliding engagement with the guide and having a lubricant passage through said flat surface which forms an orifice with the cylindrical surface, and a plunger in sliding engagement with the guide and bearing against the fulcrum for automatically adjusting lash, said spherical surface and guide preventing the transmission to the plunger of forces from the cam to the plunger in a direction transverse to the direction of reciprocation of the plunger; means for supplying lubricant under pressure through the fulcrum passage to the pivot means on the rocker arm; and a conduit in the rocker arm for conducting lubricant from the fulcrum passage to a point adjacent the cam, said cylindrical surface on the rocker arm rolling across the lubricant passage to vary the effective opening of said orifice as the rocker arm moves.

2. An internal combustion engine comprising in combination a reciprocable valve supported in the engine, a pivoted rocker arm bearing on the valve and bearing on a fulcrum which is reciprocable within a guide, a cam rotatable against the rocker arm for operating the valve, the cam producing components of force on the rocker arm in the direction of its length and perpendicular to its length, an automatic lash adjuster for the fulcrum and means for preventing transmission from the cam to the fulcrum of components of force in the direction of the length of the rocker arm.

3. An internal combustion engine comprising in combination a reciprocable valve supported in the engine, a guide fixed in the engine, a rocker arm bearing on the valve and having a portion pivoted in and slidable against the guide, a rocker surface on the pivoted portion of the rocker arm, an automatic lash adjuster including a plunger slidable in the guide, a fulcrum in said guide and supported by the plunger and supporting the rocker surface, and a cam engaging said rocker arm for oscillating the rocker arm about its pivot to reciprocate the valve.

4. An internal combustion engine comprising in combination a reciprocable valve supported in the engine, a guide fixed in the engine, a rocker arm bearing on the valve and having a pivot including a spherical surface pivoted in and slidable against the guide, a rocker surface on the pivot of the rocker arm, an automatic lash adjuster including a plunger slidable in the guide, a fulcrum in said guide and supported by the plunger and supporting the rocker surface, and a cam engaging said rocker arm for oscillating the rocker arm about its pivot to reciprocate the valve.

5. An internal combustion engine comprising in combination a reciprocable valve supported in the engine, a guide fixed in the engine, a rocker arm bearing on the valve and having a pivot including a spherical surface pivoted in and against the guide, a cylindrical rocker surface on the pivot of the rocker arm, the center of the spherical surface being substantially on the rocker surface, an automatic lash adjuster including a plunger slidable in the guide, a fulcrum in said guide and supported by the plunger and supporting the rocker surface, and a cam engaging said rocker arm for oscillating the rocker arm about its pivoted end to reciprocate the valve.

6. An internal combustion engine comprising in combination a reciprocable valve mounted in the engine, a pivoted rocker arm engaged and operated by a cam for operating the valve; an automatic lash adjuster for the pivot, the lash adjuster including a guide fixed in said engine, a plunger slidable in the guide, a fulcrum for the rocker arm carried by the plunger and slidable in said guide, means constantly urging the plunger and fulcrum out of the guide, a positive stop for the plunger and fulcrum between the ends of the guide; and means for pivoting the rocker arm in the guide on the side of the positive stop opposite to the plunger.

References Cited

UNITED STATES PATENTS

| | | | |
|---|---|---|---|
| 1,792,836 | 2/1931 | Handwerker | 123—90 |
| 1,958,264 | 5/1934 | Chilton. | |
| 2,322,172 | 6/1943 | Spencer | 184—6 |
| 2,412,457 | 12/1946 | Harrison | 123—90 |
| 2,572,968 | 10/1951 | Bachle | 123—90 |
| 2,811,959 | 11/1957 | Etchells | 184—6 |
| 2,873,730 | 2/1959 | Kilgore | 123—90 |
| 2,763,250 | 9/1956 | Bensinger et al. | 123—90 |
| 2,766,745 | 10/1956 | Purchas | 123—90 |
| 3,153,404 | 10/1964 | Van Slooten | 123—90 |
| 3,170,446 | 2/1965 | Dolza | 123—90 |

AL LAWRENCE SMITH, *Primary Examiner.*